April 13, 1954     D. H. CLEWELL     2,675,086
METHOD AND APPARATUS FOR SEISMIC PROSPECTING
Filed May 3, 1948     3 Sheets-Sheet 1

INVENTOR
DAYTON H. CLEWELL
BY *Sidney A. Johnson*
ATTORNEY

April 13, 1954   D. H. CLEWELL   2,675,086
METHOD AND APPARATUS FOR SEISMIC PROSPECTING
Filed May 3, 1948   3 Sheets-Sheet 2
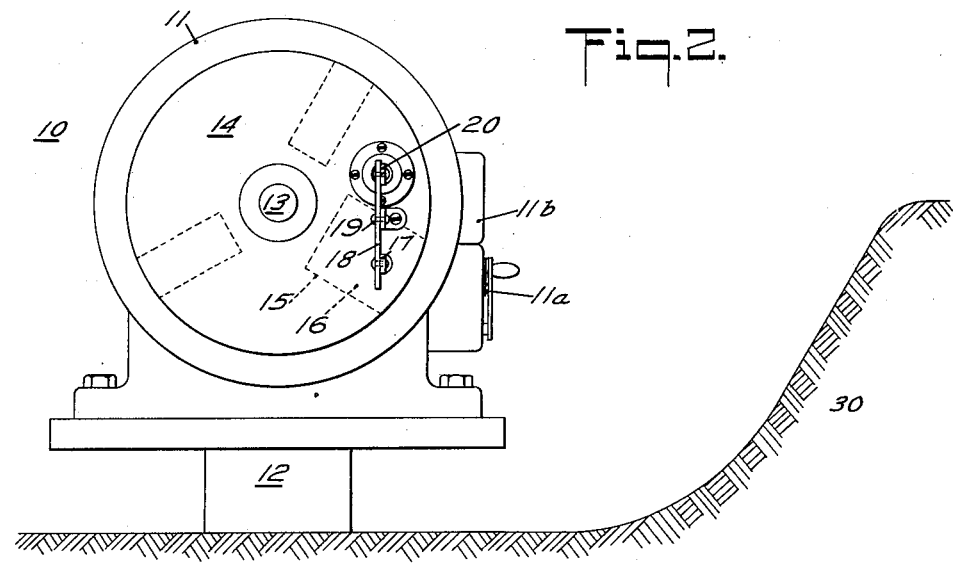
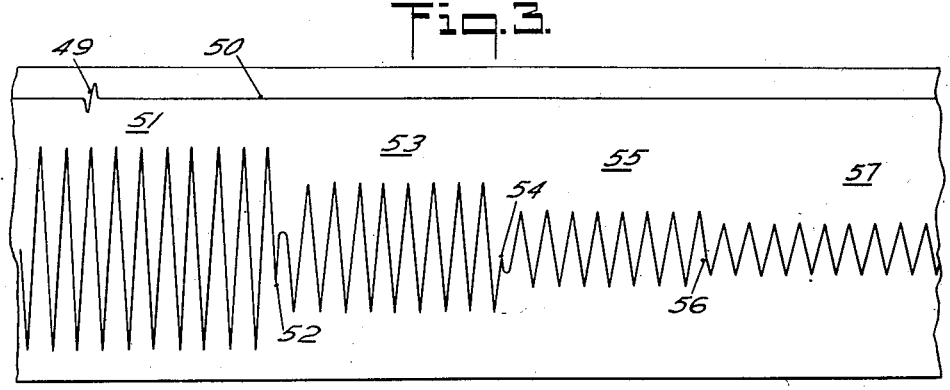
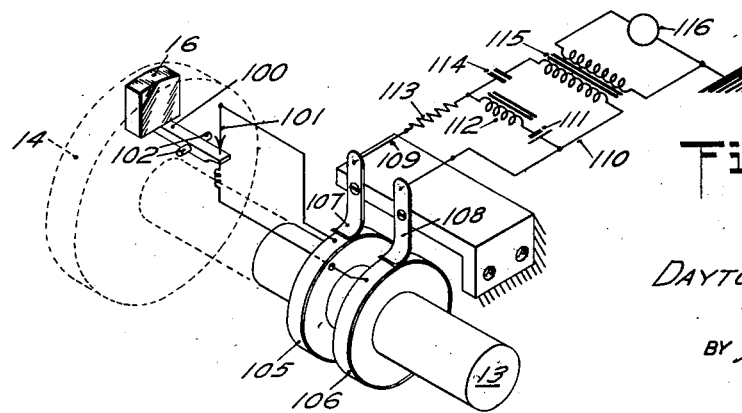
INVENTOR
DAYTON H. CLEWELL
BY Sidney A. Johnson
ATTORNEY April 13, 1954 D. H. CLEWELL 2,675,086
METHOD AND APPARATUS FOR SEISMIC PROSPECTING
Filed May 3, 1948 3 Sheets-Sheet 3

INVENTOR
DAYTON H. CLEWELL
BY
ATTORNEY

Patented Apr. 13, 1954

2,675,086

UNITED STATES PATENT OFFICE 2,675,086

METHOD AND APPARATUS FOR SEISMIC PROSPECTING

Dayton H. Clewell, Dallas, Tex., assignor, by mesne assignments, to Socony-Vacuum Oil Company, Incorporated, New York, N. Y., a corporation of New York Application May 3, 1948, Serial No. 24,693

12 Claims. (Cl. 181—0.5)

This invention relates to seismic prospecting and is directed to the provision of a method and apparatus for conducting a seismic survey in which seismic energy of predetermined frequency is imparted to the earth and caused to produce a transient, the character of which may be controlled, from the recording of which precise data relating to subsurface formations may be derived.

As a general practice in seismic prospecting, charges of dynamite are detonated in near-surface formations of the earth. The seismic waves generated by such explosions travel to subsurface interfaces where they are reflected or refracted. Energy reflected from or refracted at such interfaces travels back to the surface where it is detected, amplified and recorded. Interpretation of the resulting seismograms yields subsurface geological data.

There are several disadvantages to the well known methods of seismic prospecting. One disadvantage is that ground-roll noise-energy and the reflected energy may be included in the same frequency band, which band generally is in the range of from 20 to 80 cycles. This makes it difficult in many instances to distinguish the recorded reflections over the recorded ground noise. Another disadvantage is that when making a survey by taking observations at successive points along a line, as is the usual custom in continuous profiling, the explosive charges may or may not be located in the same formation in shot holes associated with succeeding profiles; they may or may not be subject to the same tamp conditions when detonated; and, in general, may not be expected to produce impulses of the same character shot after shot. Present practice of utilizing a transient explosion impulse is disadvantageous where subsurface formations are characterized by being short in section, or where "thinning" or "pinch-out" of formations is present. Surveys utilizing signals of long wave length, as those predominant upon detonation of an explosive charge, generally fail to delineate the boundaries of such formations.

In contrast to usual seismic methods, and in avoidance of the above-noted disadvantages, the method of the present invention may be practiced by utilizing a source of steady-state signals, as for instance, a ground driver which imparts to the earth a signal of constant amplitude and frequency. The frequency employed may be within the frequency range presently used in seismic surveys. However, the operating range may also be somewhat above the usual range and might extend to or beyond 1,000 cycles. The frequency will usually be considerably less than 1000 cycles per second. The steady-state signals are detected at stations spaced one from the other and from the driving station or "shot point" as in usual practice. Signals thus detected may be amplified and recorded by suitable means. At a time which corresponds to the "shot instant" in usual seismic procedures, the driving force is abruptly terminated. The steady-state signal subsequently received at the detecting stations will become smaller and smaller in abrupt steps as the trains of seismic waves reflected from succeedingly deeper formations are terminated.

In carrying out the method of the invention in one form thereof there is transmitted to or generated in the earth a seismic signal of constant frequency and constant amplitude. This signal is detected at stations which, in general, may correspond to a spread of geophones as used in regular seismic prospecting, being spaced at regular intervals one to the other and in predetermined spacial relationship with respect to the point of generation. The signal detected by the geophones in the spread is made up of several components. The signal consists essentially of waves traveling in a direct or refracted path from the driving unit to the detecting stations plus waves which have traveled downwardly from the driving unit to subsurface beds and there reflected back toward the surface. Stated another way, the signal detected by a geophone is a composite signal comprising the direct or refracted wave and all reflected waves from succeedingly deeper formation boundaries. At a desired instant, which may correspond to the shot instant in regular seismograph practice, the driving force is abruptly terminated. At a later time (later by the amount of time necessary for the direct wave to travel from the driving unit to the detecting station) the direct wave abruptly ceases at the detecting station, and the signal received by the geophone thereafter represents a summation of the reflected waves only. The signal detected by the geophone thereafter will decrease in abrupt steps as reflected components of the composite wave abruptly terminate. The signals thus detected at the geophone stations may be amplified and recorded as on a photographic film or sensitized paper in the usual manner.

If the time or instant at which the driving force is abruptly terminated is recorded, the time necessary for an impulse to travel along the direct path to the detecting station, and likewise to subsurface formation boundaries and return, may be readily determined by abrupt changes in amplitude and/or phase of the detected signals thus recorded.

The signals which are imparted to or generated in the ground are essentially trains of waves traveling in all directions from point of generation. The signal which is detected at a detecting station is a vectorial summation of the direct train of waves and all reflected or refracted trains of waves. By abruptly terminating the generation there is produced a transient which is made up of a band of frequencies centered about the steady-state frequency. As the trains of waves cease at a detecting station there will be, in general, abrupt changes in amplitude or marked changes in phase of the signal, thus affording an accurate indication of "record times."

For a more complete understanding of the manner in which this invention is carried out, reference should be had to the following description taken in conjunction with the accompanying drawings in which:

Fig. 1 diagrammatically illustrates one form of apparatus for utilizing the method of the invention in seismic surveying operations;

Fig. 2 is an end view of the mechanical driver unit of Fig. 1;

Fig. 3 illustrates the character of a record recorded from one of the detectors in Fig. 1 without channel-gain control;

Fig. 5 diagrammatically illustrates a "time break" system for the apparatus of Figs. 1 and 2.

Figure 1:
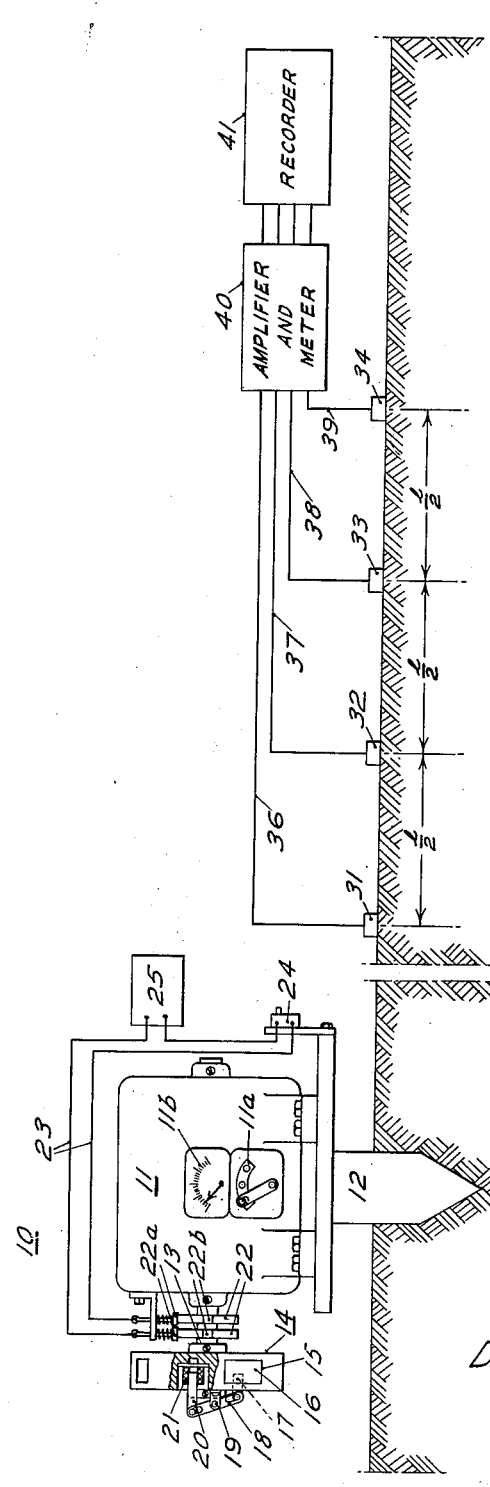

The invention provides a method of geophysical exploration which may be practiced using a system such as illustrated in Fig. 1. In this system, the source of seismic energy is a mechanical ground driver 10. It includes a suitable drive unit or motor 11 supported and fastened to the earth by an anchor or mounting 12. To the shaft 13 of motor 11 there is secured a flywheel 14 which, with its component parts, is so constructed and proportioned as to be perfectly balanced, having its center of gravity common to the longitudinal axis of shaft 13. The flywheel 14 is provided with a suitable opening in its peripheral face to receive a slug or mass which makes the rotating system eccentric, shifting or displacing its center of gravity from its axis by an amount dependent upon the ratio of the weight of the slug to that of the wheel 14 and of the radius at which the slug is positioned from the axis. The flywheel 14 is further provided with a mechanism which secures the slug to the wheel and which, when actuated, releases the slug, allowing it to slide from the opening in wheel 14 and fly free, which action immediately and abruptly reduces the eccentricity of the rotating system to zero. An alternate arrangement of the ground driver is to mount the motor 11 and the flywheel 14 in such a manner that their axis of rotation is at the center of percussion of a pendulum. The axis of the pendulum may be firmly mounted to a housing or framework which is anchored to the earth. In such modified form, the horizontal component of vibration caused by the eccentricity of the wheel 14 is absorbed by the swinging pendulum, and only the vertical component of vibration is imparted to the earth.

Referring to Figs. 1 and 2, the wheel 14 is provided with a slot or opening 15 in the edge or periphery thereof, which is proportioned to receive slug 16. A slidable pin 17 anchors the slug 16 securely in the seat or opening 15. If the motor 11 is caused to rotate, the unbalance introduced into the system by slug 16 causes the driver unit 10 to vibrate and, through the mounting 12, causes those vibrations to be imparted to the earth. The vibrations or signals thus introduced into the earth are, in magnitude, a function of the weight of slug 16, its effective radius or distance from the axis of shaft 13, and the frequency or speed of rotation.

The motor 11 is preferably one of variable speed and has associated therewith a suitable speed control 11a and a mechanism such as a tachometer 11b for indicating its speed. By this means the frequency of the signal may be observed and adjusted by an operator to any value within the speed range of the motor 11. In accordance with the invention the frequency of the signal (or the speed of the motor 11) is, for a given record or observation, pre-selected and maintained constant at that pre-selected value. The choice of the selected frequency is predicated upon the character of the area being investigated. Obviously, several observations may be made at a given location using a different frequency for each observation. Generally speaking, the selected frequency is preferably somewhat above the lower end of the range of frequencies usually recorded in seismic investigation, or it may be above the 20–80 C. P. S. band more clearly to define subsurface boundaries and to eliminate masking of reflected signals by spurious low-frequency ground noises. The signal imparted to the earth by the flywheel 14 with the slug 16 fastened thereto may be termed a steady-state signal; that is, one of constant amplitude and constant frequency. This signal is detected as by a plurality of seismic detectors positioned in predetermined spacial relationship with respect to the driver unit 10. As shown in Fig. 1, the detectors 31—34 are positioned in a straight line and are spaced one-half wavelength apart with respect to the above mentioned selected frequency.

That part of the signal from which information of subsurface strata is derived is the modulation of the steady-state vibrations developed at the instant the slug 16 is released from the flywheel 14. Essentially, the steady-state signal is modulated at the instant slug 16 is discharged from flywheel 14 by a transient made up of a band of frequencies centered about the steady-state frequency. The release of the slug 16 produces such modulation by immediately reducing the eccentricity of the rotating system to zero, thus abruptly terminating the driving forces imparted to the earth. The mechanism for releasing slug 16 at a desired instant includes a toggle arm 18 pivoted at 19 and fastened or connected to a solenoid armature 20. A solenoid coil 21 is disposed on the flywheel 14 which, when energized, retracts armature 20 which, through toggle arm 18, removes pin 17 from slug 16 allowing it to slide from its seat and fly free. The coil 21 is energized through segmented slip-rings 22, contacts 22a, conductors 23, switch 24, and a source of potential 25. The electrical circuit for energizing the coil 21 is preferably completed by the slip-rings at such angular positions thereof that the slug 16 will always be released from the wheel 14 at the same angular position. More particularly, the slip-rings 22 are segmented, having but a small portion of their total circumference, the portion 22b, formed of conducting material. The conducting segments 22b are connected to coil 21 and are so oriented with respect to the position of slug 16 that, for repeated operations, current will flow through those segments to coil 21 during a predetermined portion of the cycle following actuation of switch 24 in order that slug 16 will be released from flywheel 14 at a predetermined angular position. In this manner, modulation of the steady-state signal may be so controlled that the character of the modulated signal will be duplicated each time the slug 16 is released.

In order to eliminate an unwanted impulse which would otherwise be introduced as slug 16 strikes the earth, an absorbent cushioning receptacle or mass is so oriented with respect to the flywheel 14 that the slug 16 will be received therein or thereon. This receptacle or mass absorbs and attenuates the otherwise sharp impulse to reduce any effect it may have to a negligible value. Such a mass is indicated in Fig. 2, as an embankment 30 of sand or loose earth. However, it may be a rubber or a fiber mass suitably positioned with respect to flywheel 14 to absorb the kinetic energy of slug 16 upon its release. The slug 16 may also be released for vertical travel to delay its return to earth until after recording of the reflections.

In operation, the driver unit 10 is suitably anchored to the earth, the detectors 31—34 are positioned at the desired location and are connected through the amplifiers 40 to the recorder 41. The slug 16 is placed in its seat 15 and anchored there by pin 17. Motor 11 is then energized and brought up to such a speed that the signals or vibrations are of the selected amplitude and frequency. The speed of the motor is then maintained constant for such a period that the signal received by the detectors is steady and made up of the direct wave and all trains of waves reflected from subsurface boundaries. Thus, the signal received by each of the detectors 31—34 is the summation of the direct or refracted wave and all waves reflected from relatively deep interfaces. A seismogram of such a signal as detected by detector 31 is shown at 51 in Fig. 3. At an instant 50 following actuation of switch 24 the slug 16 is released. The instant at which the slug 16 is released from the wheel 14 is recorded by circuit and means not included in Figs. 1 and 2, but illustrated diagrammatically in Fig. 5. This circuit provides that the instant slug 16 begins movement out of its seat an electrical impulse is generated and transmitted to the recorder. More specifically, as slug 16 begins to move, a switch comprising contact members 100 and 101 is opened as the member 100 pivots about axis 102 following the release of slug 16. This switch opens a circuit comprising conductors 103—104, additional slip-rings 105—106, brush contacts 107—108, conductors 109—110, voltage source 111, inductance 112, and resistance 113. As this circuit is opened, condenser 114 is rapidly charged, as the voltage across source 111 and inductance 112 changes. This causes a sharp impulse to be transmitted through transformer 115 to a galvanometer 116. The recording instrument 41 includes the galvanometer 116 by which the impulse is recorded.

In Fig. 3 this instant is indicated by the "time break" 49 on trace 50. Following the release of slug 16, the train of waves refracted along a near-surface path to the detector 31 abruptly ceases. The time at which the train of direct waves ceases to be a component of the signal at the location of geophone 31 is indicated at time 52 by a sharp phase change and a marked decrease in amplitude. Thereafter, the portion of the seismogram in section 53 is a summation of all trains of waves reflected from subsurface interfaces. At time 54 the train of waves from the shallowmost reflecting horizon ceases as indicated by an abrupt phase change and decrease in amplitude. At the time during which the subsequent portion 55 is recorded, the signal is a summation of the trains of waves reflected from all reflecting horizons deeper than the aforementioned shallowmost reflecting horizon. In a similar manner, the train of waves reflected from a second reflecting horizon ceases at time 56, and thereafter the signal in the section 57 is composed of trains of waves reflected from deeper formations.

By thus recording the "times" at which trains of waves cease, the time for an elastic wave to travel from the location of the driver unit on the surface to each of the reflecting horizons and back to the detectors may be readily determined. By utilizing this travel time, the velocity of sound in such formations, and the geometrical configuration of the spread and driver unit, the depth and the dip of each of the reflecting horizons may be computed.

The system above described utilizes the unbalanced mechanical ground driver 10 as the source of steady-state signals. The signals generated by such a driver are sine waves. The requirements placed upon the signal at the point of generation are not so strict that practice of the method requires generation of signals by a mechanical driver, or generation of signals of pure sine wave form. An alternative form of generator may comprise a plurality of charges of dynamite positioned at or near the earth's surface and detonated in succession at a predetermined rate to establish a steady-state signal condition. The frequency of the signal, thus the rate at which the charges must be detonated to establish the steady-state signal, will correspond to or be the same as the frequency of the signal generated by the mechanical ground driver of Fig. 1. Thus, if the predetermined frequency is to be 100 cycles per second, the explosives would be detonated at the rate of 100 charges per second. Such a steady-state signal may be generated using multiple blaster means such are are commonly known in the art. For example, a blaster device such as generically illustrated in Fig. 10 of Patent No. 2,377,903 to Rieber may be used for detonation of a plurality of charges to generate the steady-state signal. Blaster circuits and charges of sufficient number may be provided as above indicated. At a distance from the point of detonation of such charges the high-frequency components are so attenuated that the steady-state signal is essentially one of sine wave character.

For brevity, the term "steady-state signal" is defined as a signal which at its source is generated for a period of time equal to or greater than the time required for an elastic wave to travel from the point of generation to the deepest reflecting interface selected for a particular observation and thence to a detecting station at the surface, minus the time of travel of an elastic wave from the point of generation in a direct path to the same detecting station. Thus, a steady-state signal ordinarily will be generated at its source for a period of from 1 to 2 seconds or more. The reflection times primarily determine the minimum period necessary to establish a steady-state signal, since, from the geometry of the spread arrangement, the travel time by way of the direct path is generally small compared to reflection times.

The particular advantage of the method of the invention, divorced from the particular means herein described for practicing it, is that desired seismic signals at the detector are made up of a band of frequencies centered around the steady-state frequency. Since the steady-state frequency can be predetermined, it is possible to control the seismic signal frequency band and force it into a range where reflections can be obtained under optimum conditions. Where a generator which comprises a plurality of explosive charges successively detonated is utilized as the source of waves in practicing the method herein described, it is feasible to use the initiation or the front end of the train of elastic waves as the modulation impulse. In such case the record times would be computed, or the time break derived from, the detonation of the first of the series of explosive charges. The arrival of the direct wave and of each of the trains of reflected waves would be recorded rather than their termination as heretofore described. However, the latter procedure has the inherent disadvantage that trains of reflected waves of relatively small amplitude would be added to the comparatively large amplitude train of direct waves, the result being that their arrival would be masked or hidden. Though the train of direct waves may be substantially cancelled by mixing the outputs of detectors spaced a half-wavelength apart (L/2) as in Fig. 1, the necessity of such precautions is eliminated in the present invention utilizing either the mechanical shaker or the dynamite charges, because the direct wave is the first to be terminated at the detecting station, and thereafter the amplitude of ground vibrations is due to reflected energy only. Thus in the preferred form of the invention there is utilized the modification of signals received at geophone stations due to the termination of the steady-state signal at the sending station.

The single trace seismogram of Fig. 3 is recorded without gain-control on the amplifier channel. In general, however, seismograms are multi-trace recordings. In such case, each of a plurality of amplifiers has automatic gain-control so that the amplitude of each trace will remain essentially at a pre-set value in spite of the change in intensity of the ground vibration or seismic signals as a function of time. By such means, each trace of the multi-trace record is distinct and may readily be distinguished from each of the other traces.

Figure 4:
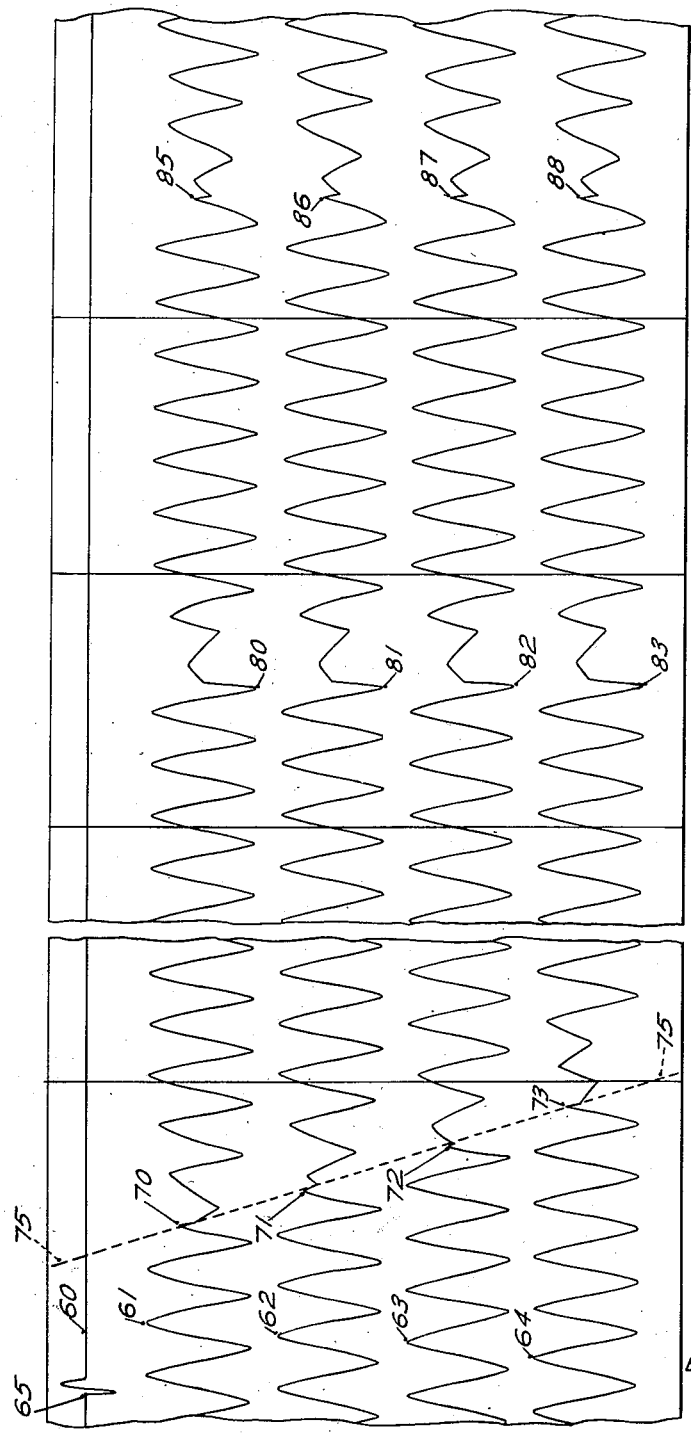
Fig. 4 is typical of seismograph records of the type obtainable with the system of Fig. 1.

A multi-traced seismogram made with the system of Fig. 1 is shown in Fig. 4. In this particular seismogram the signals from the geophones 31—34 are recorded unmixed on the traces 61—64 respectively. It is to be understood that signals from adjacent geophones may be mixed or combined as is general practice to produce a record trace which for any instant, represents the sum of the voltages generated by two or more geophones. Since the detectors are spaced one-half wavelength apart, the direct wave may thus be cancelled or substantially reduced. For the purpose of this description, however, the signals are considered to be recorded unmixed. The automatic volume control (AVC) in each of the amplifiers in bank 40 is pre-set to produce a trace of predetermined amplitudes, for instance, three-quarters of an inch (¾"). The time break 65 indicating the instant at which slug 16 is released from the flywheel 14 is recorded on trace 60. At a time 70 following the release of slug 16 the train of direct waves ceases at the location of geophone 31, this being indicated on trace 61 by an immediate decrease in amplitude and a change in phase. This is subsequently followed, due to the expanding action of the AVC, by a gradual increase in trace amplitude to that of the pre-set or predetermined amplitude. Similarly, as the train of direct waves ceases to drive geophone 32, there is an abrupt decrease in trace 62 at time 71. Likewise, for geophones 33 and 34 there occurs a decrease in amplitude and a change in phase at times 72 and 73 on traces 63 and 64 respectively. The dotted line 75 drawn through the record times or points 70—73 may be termed, as in regular seismograph practice, the "first-break step-out." At a record time 80, which corresponds to the instant at which a train of waves reflected from the first or the shallowmost reflecting horizon terminates, the amplitudes of the traces of the record are immediately and markedly changed, affording accurate measurement of the travel time from the surface to the reflecting horizon and return. This is indicated on the record as times 80—83. In general, the "time" on the record indicating the instant that a train of waves ceases will be identified by a change both in phase and in amplitude. It is to be noted, however, that in certain instances the identifying character may be purely a phase change or it may be, as at times 80—83, purely an amplitude change. It is evident that the change will, in each instance, depend upon the phase angle between the train of waves terminating and of the summation of all remaining trains of waves. A "reflection" from a second and deeper reflecting horizon is indicated by both a phase and an amplitude change recorded at times 85—88. The seismogram pictured in Fig. 4 in general corresponds to a seismogram produced in regular seismograph practices. The signal indicating that time usually termed the "shot instant" or "time break," is the base or zero for determining "reflection" or travel times. The first break and "reflection" times for succeedingly deeper formations are clearly indicated.

The detector-amplifier-recorder system for production of such a record may be one of the several well known types. For instance, it may be of the type generally indicated in Fig. 7 of Patent No. 2,209,100 to J. P. Minton. If this system is to be used, it is necessary that both the geophones, and the galvanometers in the recording camera, be sensitive to the frequencies at which the driver unit 16 vibrates the earth. The foregoing description has assumed that a suitable time indicating and recording device is also associated with the recording instrument, such as that indicated in Fig. 7 of the aforementioned Minton patent, in order to establish an accurate time scale on each record. Further, this description and the accompanying sketches relate to a particular system wherein four geophones and four amplifier channels are used to produce a four-trace record. This system has been described by way of example, and it is evident that, if desired, records having a greater number of traces may be produced, or that various spread configurations and mixing arrangements may be utilized.

By employing this new and novel method of seismic exploration, the frequencies at which the investigations are conducted may be chosen at the discretion of the operators to yield the particular information desired at a particular location. This method may be used in place of regular seismograph techniques to yield data of subsurface formations. In general, use of this new seismic exploration system will yield more precise results than regular procedures. Further, where regular seismograph techniques fail to delineate boundaries of a formation characterized from spread to spread as becoming thinner and thinner until reflections from adjacent boundaries or interfaces are no longer clear and distinct on a regular seismograph record, the present invention may be utilized to advantage, using higher frequencies by which strata or beds of thinner section may be delineated.

Although in the preceding description the invention has been described as one in which the signals are abruptly terminated, necessitating a perfectly balanced flywheel, it is not required that the signals be completely terminated, for a sharp reduction in their amplitude will have a similar measurable effect. It is therefore not strictly necessary that the flywheel be perfectly balanced so long as the residual displacement of the center of gravity of the flywheel per se is small relative to the displacement effected by the releasable mass.

Though a preferred embodiment of the present invention has been disclosed in such detail as to enable any person skilled in the art to make, construct and use the same, it is to be understood that further modifications may suggest themselves which will be within the scope of the appended claims. For instance, it may be desirable in the interest of securing more uniform results to adapt the ground shaker for installation in a shallow borehole. In this case, the object is to anchor the ground shaker to an unweathered formation which is usually more efficient in the transmission of seismic energy than the relatively unconsolidated surface layer.

What is claimed is:

1. In seismic prospecting the method which comprises at a sending station generating seismic waves of predetermined constant frequency and amplitude for a time at least sufficient to establish a steady-state signal at a plurality of fixed receiving stations, thereafter abruptly terminating generation of said waves to produce at said receiving stations a signal which decreases abruptly in steps respectively corresponding with termination of reflections from successively deeper earth layers, and recording said waves in correlation with time as they arrive at each of said stations.

2. In seismic prospecting wherein seismic signals are detected and recorded at a receiving station, the method of determining the character and location of subsurface formations which comprises generating at a sending station seismic waves of constant amplitude and single predetermined frequency, abruptly terminating generation of said signals to impart to said waves a transient made up of a band of frequencies centered about said predetermined frequency, recording said seismic waves as detected at a detecting station to produce a record characterized by abrupt changes in phase and amplitude indicative of subsurface reflecting boundaries between said stations.

3. In a seismic prospecting system, a source of seismic signals comprising a flywheel whose center of gravity is located at the axis thereof, a mass, means for fastening said mass to said flywheel to displace said center of gravity from said axis, means for rotating said flywheel to generate a train of elastic waves in the earth, and means for discharging said mass from said flywheel to return said center of gravity to said axis and abruptly terminate generation of said train of waves.

4. A source of seismic signals comprising a flywheel whose center of gravity is located at its axis, a mass, means for fastening said mass to said flywheel to displace said center of gravity from said axis, means for rotating said flywheel at a predetermined frequency to generate a train of elastic waves of constant frequency in the earth, and means for discharging said mass from said flywheel to return said center of gravity to said axis and abruptly terminate the generation of said train of waves.

5. A seismic signal generator comprising the combination of a flywheel, a weight attached to said flywheel, means for rotating said flywheel to generate a train of elastic waves in the earth, means for controlling the frequency of said train of elastic waves, and means including an electromagnet for discharging said weight from said flywheel abruptly to terminate the generation of said train of waves.

6. A seismic signal generator comprising the combination of a flywheel, a weight releasably attached to said flywheel, means for rotating said flywheel for generating a train of elastic waves in the earth, means for controlling the frequency of said train of elastic waves, an electromagnet to release said weight, means including segmented slip-rings for completing the circuit to said electromagnet to release said weight at a predetermined angular position of said weight abruptly to terminate said train of elastic waves at a predetermined instant.

7. The method of seismic prospecting which comprises generating a steady-state train of single-frequency elastic waves in the earth at a substantial distance from at least one detecting station, abruptly terminating the generation of said train of waves after arrival thereof at said detecting station, and recording in correlation with time the waves detected at said station for measurement of the time interval between the termination of generation of said train of waves and the termination of trains of waves reflected from subsurface strata to determine the depth of said strata.

8. The method of seismic prospecting which comprises generating at a sending station a steady-state train of single-frequency elastic waves in the earth, at a detecting station spaced from the point of generation detecting the sum of all trains of waves reaching said detecting station, abruptly terminating the generation of said waves after arrival at said detecting station, recording the instant of termination of generation of said waves, and continuously recording said sum of trains of waves as received at said station for measurement of the time interval between said last-named instant and the termination of successive trains of waves at said detecting station to determine the depths of earth strata.

9. In a seismic prospecting system, the combination of a seismic detector located on the earth at a receiving station, a recorder connected to said detector, a generator of seismic waves located at a transmitting point remotely spaced from said receiving station, driving means for said generator, structure coupling said generator to the earth for transmitting said train of waves into the earth, said generator having a heavy mass structure repeatedly movable between predetermined positions for generating a train of high amplitude seismic waves of predetermined frequency, said generator having releasable structure movable from a first control position to a second control position, said mass structure being effective to generate said train of high amplitude waves of said frequency with said releasable structure in one control position and ineffective to generate them with said releasable structure in said second control position, and means for actuating said releasable structure from said first control position to its second control position after establishment at said receiving station of said train of waves originating at said transmitting point for producing a seismic record characterized by termination of said wave train followed by successive terminations of additional wave trains reflected from subsurface interfaces.

10. In a seismic prospecting system, the combination of a seismic detector located on the earth at a receiving station, a recorder connected to said detector, a generator of seismic waves located at a transmitting point remotely spaced from said receiving station, driving means for said generator, structure coupling said generator to the earth for transmitting said train of waves into the earth, said generator having a heavy mass structure repeatedly movable between predetermined positions for generating a train of high amplitude seismic waves of predetermined frequency, said generator having releasable structure abruptly movable from a first control position to a second control position, said mass structure under the control of said releasable structure being effective to generate said train of high amplitude waves of said frequency with said releasable structure in one control position and being abruptly rendered ineffective to generate them by movement of said releasable structure from said first position to said second position, and means for actuating said releasable structure from its first to its second control position after establishment of said receiving station of staid train of waves originating at said transmitting point for producing a seismic record characterized by abrupt termination of said wave train followed by successive abrupt terminations of additional wave trains reflected from said subsurface interfaces.

11. In a seismic prospecting system, the combination of a seismic detector located on the earth at a receiving station, a recorder connected to said detector, a generator of seismic waves located at a transmitting point remotely spaced from said receiving station, variable speed driving means for said generator, structure coupling said generator to the earth for transmitting said train of waves into the earth, said generator having a heavy rotating mass structure eccentrically mounted with respect to its axis of rotation for generating a train of high amplitude seismic waves of predetermined frequency, said generator having releasable structure movable from a first control position to a second control position for controlling the generation of said train of seismic waves, said mass structure with said releasable means in said first position being eccentrically rotated to generate said train of waves and with said releasable structure in said second control position being ineffective to generate said seismic waves, and means for actuating said releasable structure from said first to said second control position after establishment at said receiving station of said train of waves originating at said transmitting point for producing a seismic record characterized by termination of said wave trains followed by successive teminations of additional wave trains reflected from subsurface interfaces.

12. The method of seismic prospecting which comprises at a sending station generating a steady-state train of elastic waves in the earth at a substantial distance from at least one detecting station, said steady-state train of waves being characterized by an abrupt termination at said sending station after arrival of said train at said detecting station, detecting said waves at said detecting station, and recording in correlation with time the waves detected at said station for measurement of the time interval between said abrupt termination and the termination of trains of waves at said detecting station reflected from subsurface strata to determine the depth of said strata.

References Cited in the file of this patent

UNITED STATES PATENTS

| Number | Name | Date |
|---|---|---|
| 1,240,328 | Fessenden | Sept. 18, 1917 |
| 1,743,358 | Koenigsberger | Jan. 14, 1930 |
| 1,867,098 | Rieber | July 12, 1932 |
| 1,876,524 | Thearle | Sept. 6, 1932 |
| 2,160,314 | Ongaro | May 30, 1939 |
| 2,235,089 | Sparks | Mar. 18, 1941 |
| 2,281,751 | Cloud | May 5, 1942 |
| 2,336,429 | Wenger | Dec. 7, 1943 |
| 2,420,672 | Maillet | May 20, 1947 |

FOREIGN PATENTS

| Number | Country | Date |
|---|---|---|
| 400,880 | Great Britain | Nov. 2, 1933 |